United States Patent [19]

Carrington et al.

[11] Patent Number: 5,112,361

[45] Date of Patent: May 12, 1992

[54] METHOD OF MANUFACTURING COLOR FILTERS FOR LIQUID CRYSTAL CELLS

[75] Inventors: Andrew N. Carrington, Hemel Hempstead; Bernard J. Green, Harrow; Francis Jones, deceased, late of Leeds, all of England, by Jean Jones, Legal Representative

[73] Assignee: Thorn EMI plc, London, England

[21] Appl. No.: 647,015

[22] Filed: Jan. 29, 1991

[30] Foreign Application Priority Data

Jan. 30, 1990 [GB] United Kingdom ............... 9002099

[51] Int. Cl.⁵ .............................................. D06P 5/00
[52] U.S. Cl. ................................. 8/471; 8/469; 8/470; 8/638
[58] Field of Search ................... 8/471, 470, 469, 638

[56] References Cited

U.S. PATENT DOCUMENTS

| | | | |
|---|---|---|---|
| 4,596,190 | 6/1986 | Hanstein et al. | 8/471 |
| 4,740,497 | 4/1988 | Harrison et al. | 8/471 |
| 4,842,613 | 6/1989 | Purser | 8/471 |
| 4,923,860 | 5/1990 | Simons | 8/471 |
| 4,965,242 | 10/1990 | De Boer et al. | 8/471 |
| 4,968,658 | 11/1990 | Beck et al. | 8/471 |

Primary Examiner—A. Lionel Clingman
Assistant Examiner—Brandley A. Swope
Attorney, Agent, or Firm—Fleit, Jacobson, Cohn, Price, Holman & Stern

[57] ABSTRACT

A method of manufacturing a color filter for a liquid crystal cell comprises forming a plurality of patterns, each of a respective dye intermediate material, on a carrier element. The patterns of dye intermediate materials are then brought into contact with a substrate layer, supported on a glass substrate, under the application of heat and pressure. The substrate layer, such as a polyacrylonitrile layer, contains free acid groups which interact with the dye intermediate materials to form the colors of the color filter in the substrate layer. The method permits the actual formation of the colors on the substrate to be effected in a single alignment step, minimizing wastage of the relatively expensive glass substrates. Furthermore, as the dyes providing the colors of the filter are chemically part of the substrate layer, they are very resistant to leaching by the liquid crystal materials.

10 Claims, 1 Drawing Sheet

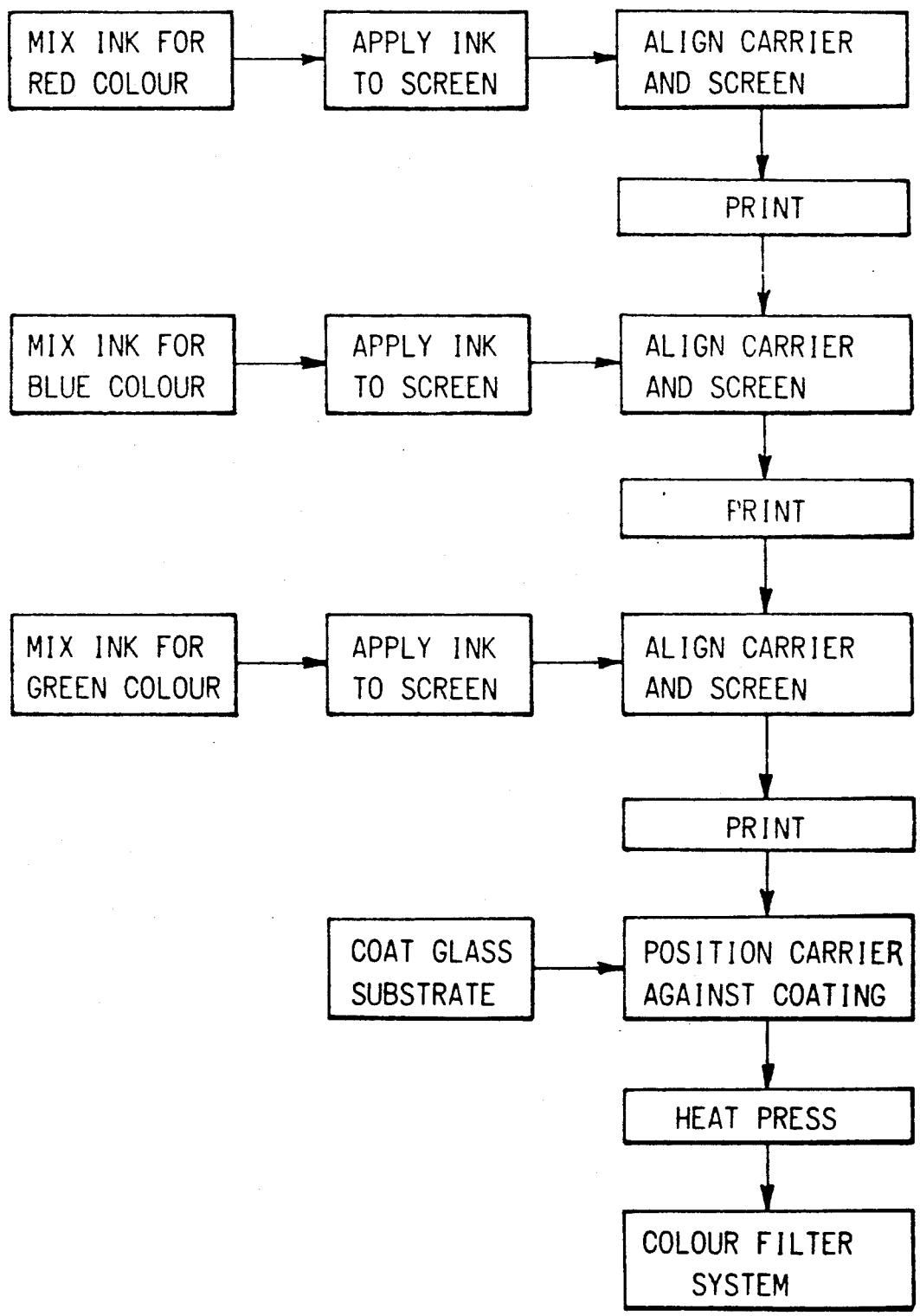

METHOD OF MANUFACTURING COLOR FILTERS FOR LIQUID CRYSTAL CELLS

The present invention relates to a method of manufacturing a colour filter for a liquid crystal cell.

Various techniques for the manufacture of colour filters for liquid crystal displays are known. For example, in PCT patent application No. W087/03381, such filters are produced by heat transfer of dye from a transfer sheet, through a mask to the liquid crystal substrate. In Japanese Patent Applications J60041002 and J60041003, an array of thermal heads is used to make selected areas of a polymer layer undyeable, and the remaining areas are then dyed. British Patent Specification 1577680 discloses a method of forming colour filters on a polymer layer by coating the polymer with photo-resist and developing to form a mask and heat transferring the dye through the apertures in the masking layer.

Colour filters for liquid crystal displays usually include dyes of three colours. The dye of each colour must be deposited very accurately to ensure that the final filter, in the form of triad colour groups, is in sufficient registration with the pixels of the liquid crystal display.

The spatial deposition of the respective colour dyes is a relatively difficult process step and, in all of the above techniques, the dyes are deposited directly onto a relatively expensive substrate of the liquid crystal display. Hence, if the patterns used to deposit the dyes are not registered accurately for each dye deposition step a relatively expensive substrate is wasted.

The present invention seeks to provide an improved method of manufacturing a colour filter for a liquid crystal display in which the problems of waste of the relatively expensive substrate through misalignment of the patterns used to deposit the dyes of the colour filter can be substantially alleviated. Furthermore, the method of the present invention provides a liquid crystal display colour filter having dyes which are very resistant to leaching, in comparison with known liquid crystal display colour filters.

Accordingly, there is provided a method of manufacturing a colour filter for a liquid crystal cell, the method comprising applying a number of patterns each of a respective dye intermediate material to a carrier element, and effecting transfer of the dye intermediate materials to a substrate carrying a substrate layer of material having free acid groups for forming, in the substrate layer on interaction with the dye intermediate materials, a number of colour patterns each of a respective colour, for the colour filter.

In this way, the present invention provides a technique wherein the critical and difficult stage of aligning the patterns can be done on a carrier element so that, if any misregistration of the patterns occurs, a substrate (which tends to be an expensive, highly polished glass plate) has not been wasted. Accordingly, this technique has substantial cost-savings as compared to conventional techniques.

Moreover, the present invention provides a technique wherein the patterns can be transferred to the substrate in a single step, thereby ensuring a simple manufacturing operation which further provides cost-savings to the resultant cell.

Preferably, a dye-intermediate material comprises a dye base and a support medium mixed together to provide a material with a consistency suitable for printing.

Preferably the step of effecting transfer of the patterns from the carrier element to the substrate comprises applying heat and pressure to the carrier element and the substrate.

Preferably, the patterns of dye-intermediate materials are applied to the carrier element by a screen-printing process.

In order that the invention may more readily be understood, a description is now given, by way of example only, and with reference to the accompanying FIGURE, of a manufacturing method embodying the present invention.

The present invention provides a method for producing a three colour micro-dot colour filter system for use in liquid crystal displays. The filter system produced by this method is sufficiently planar to be used in ferroelectric liquid crystal displays. This method has the advantages over conventional methods of rapid fabrication and provides a liquid crystal display colour filter having little, if any, colour leaching by the liquid crystal material.

A first dye intermediate material is formed by mixing 0.5 g of colourless or slightly coloured dye base, such as 4-dimethylamino-4'-methoxy-2"-methyltriphenylmethanecarbinol, which generates a red colour in contact with a material having free acid groups, with a suitable support medium, for example 1.0 g secondary cellulose acetate dissolved in 8.5 g acetone, to form an admixture or ink of a consistency appropriate to screen printing. This ink is then applied to a screen in a pattern appropriate to the pixel arrangement for a liquid crystal cell. The pattern is then printed, such as by screen printing, onto a paper or polymeric carrier element of low acid content, such as polyester or acetate sheet.

A second dye intermediate material is formed by dissolving 0.5 g of Colour Index (C.I.) Basic Blue 69 base solid in for example a solution of 1.0 g secondary cellulose acetate in 8.5 g acetone, to form an ink suitable for screen printing. This ink is able to form a blue colour by alkaline modification of the dye base on interaction with a material having free acid groups. The ink is then applied to a patterned screen. After careful aligning of the screen and the carrier sheet, which already carries a pattern of the first or red colour forming dye intermediate material, to ensure correct registration of the patterns, a pattern of this blue colour forming ink is then screen printed onto the carrier sheet alongside the red pattern, thereby to provide patterns of the red and blue colour forming dye intermediate materials on the carrier sheet.

This step is then repeated with a green-forming ink so that the carrier sheet now carries three dot patterns, each of a respective one of the three dye-intermediate materials. A suitable green-forming colour is developed from a 1:1 mixture of the products of the alkaline modification of C.I. Basic Green 4 and C.I. Basic Yellow 11. The ink suitable for printing is made up from 0.25 g modified Green 4 and 0.25 g Yellow 11 using a solution of 1.0 g secondary cellulose acetate in 8.5 g acetone. These colour index bases are assumed to be readily understood by persons skilled in this art and will not therefore be referred to in greater detail in the present application.

A glass substrate is coated with a polymer material, such as a polyacrylonitrile layer with a relatively high free acid group content by spin-coating to form a substrate layer which is then dried. A suitable polyacrylonitrile is Teklan (Courtaulds Ltd.) dissolved in dimethylformamide as a 10% wt/vol solution and filtered before use. The glass substrate comprises a ground glass sheet which is used, in conjunction with a second sheet, to contain the liquid crystal material of a liquid crystal cell. After drying of the substrate layer, the printed carrier sheet, carrying the patterns of the three dye intermediate materials, is then positioned in contact with the substrate layer of polymer material on the glass substrate and both are placed in a heat press and subject to a pressure sufficient to ensure good contact between the printed surface of the carrier sheet and the substrate layer of the coated glass substrate at a temperature within the range 140°-160° C. for 30-120 seconds. This causes the dye intermediates on the carrier sheet to vaporise and to enter the substrate layer whereupon they interact with the free acid groups in the substrate layer, liberating water molecules and forming the intensely coloured ionic species of the dyes, i.e. the colours of the colour filter. As the dyes are now chemically part of the substrate layer, they are very resistant to leaching by the liquid crystal material in the finished liquid crystal cell.

Thereafter the carrier sheet and glass substrate are removed from the press and separated.

It will be realised from the above description that one advantage of this method is that the critical stage of aligning the three colours of the colour filter is carried out on a dye carrier, so if there is any misregistration during the formation of the patterns of any of the dye intermediate materials an expensive glass substrate is not wasted.

This technique can readily achieve filters of size 300 by 400 μm, and filters of 200 by 400 μm are possible.

The method is illustrated schematically in the accompanying FIGURE.

Although the present invention has been described with respect to a specific embodiment it should be realised that modifications may be effected whilst remaining within the scope of the invention. For example, the method has been described with reference to a three colour filter. However, the method of the invention may equally be used to advantageous effect to produce colour filters incorporating a different number of colours. Also, the method described above includes the step of forming the layer of material having free acid groups upon the glass substrate. It should be realised that the method may be restricted to the transfer of the dye intermediate material patterns to substrates already carrying a coating layer of suitable material.

Additionally, the colour forming dye intermediate materials have been deposited in the order red, blue and green in the example described. However, the dye intermediate materials may be deposited onto the carrier sheet in any convenient order.

We claim:

1. A method of manufacturing a colour filter for a liquid crystal cell, the method comprising applying a number of patterns each of a respective dye intermediate material to a single carrier element, and effecting transfer of the dye intermediate materials from said single carrier element to a substrate carrying a substrate layer of material having free acid groups for forming dyes in the substrate layer, on interaction with the dye intermediate materials, to produce a number of colour patterns each of a respective colour, for the colour filter.

2. A method according to claim 1 wherein the dye intermediate materials comprise an admixture of a dye base and a support medium, the admixtures having a consistency for enabling printing of the number of patterns on the carrier element.

3. A method according to claim 2 wherein the patterns of dye intermediate materials are applied to the carrier element by a screen-printing process.

4. A method according to claim 1 wherein transfer of the dye intermediate materials from the carrier element to the substrate layer is effected by application of heat and pressure between the carrier element and the substrate.

5. A method according to claim 4 wherein the transfer of the dye intermediate materials is effected at a temperature within the range of 140° to 160° C. for a time period within the range of from 30 to 120 seconds.

6. A method according to claim 1 comprising forming the substrate layer of material on the substrate.

7. A method according to claim 1 wherein the substrate layer comprises a polymer material.

8. A method according to claim 7 wherein the polymer material comprises polyacrylonitrile.

9. A method according to claim 1 wherein the dye intermediate materials comprise, respectively, 4-dimethylamino-4'-methoxy-2''-methyltriphenylmethanecarbinol, colour index basic blue 69, and a 1:1 admixture of colour index basic green 4 and colour index basic yellow 11.

10. A method according to claim 1 wherein the carrier element comprises paper, polyester or acetate sheet.

* * * * *